États-Unis Patent Office 3,501,346
Patented Mar. 17, 1970

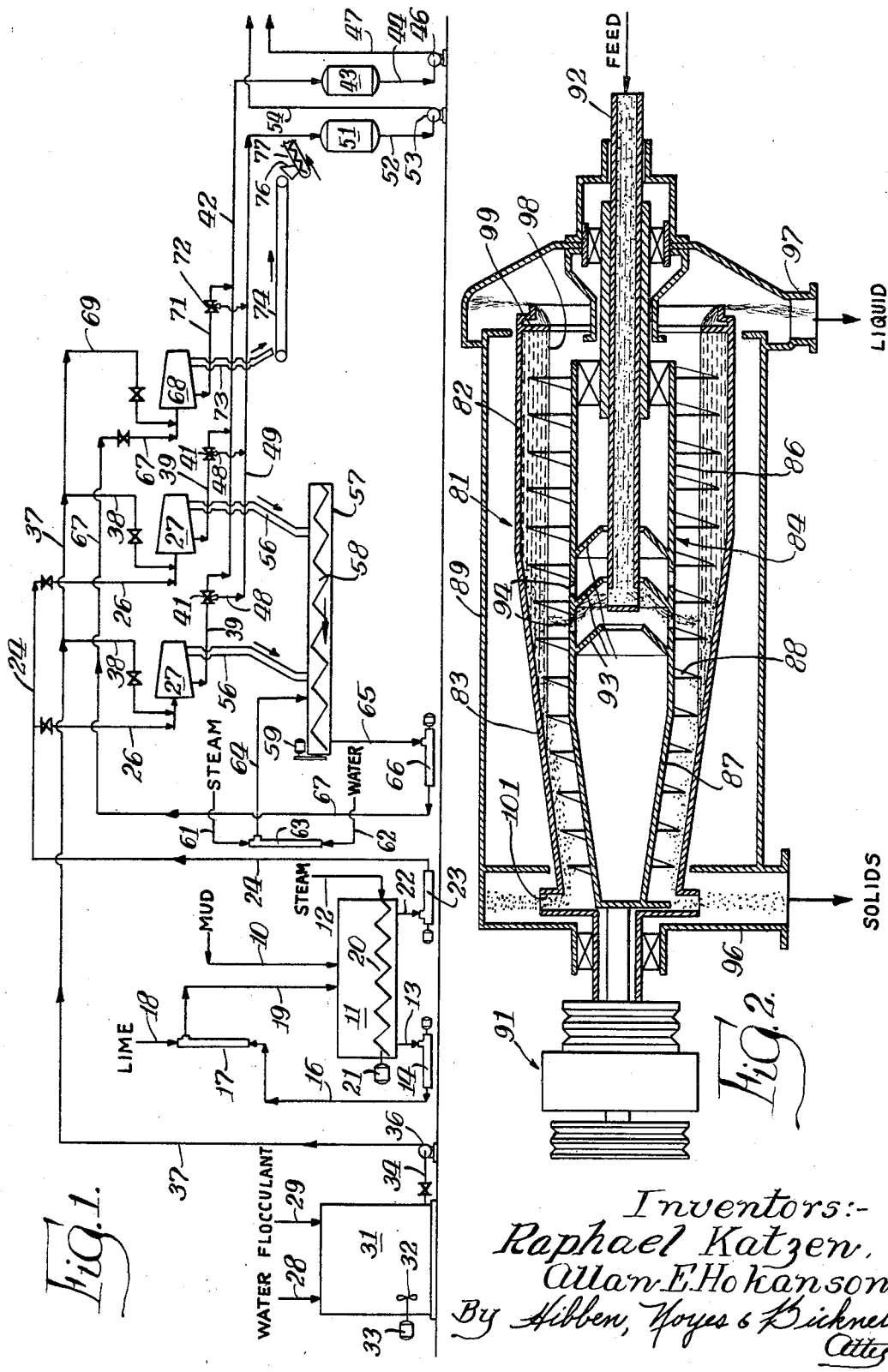

3,501,346
TREATMENT OF SUGAR MILL CLARIFIER MUD
Raphael Katzen and Allan E. Hokanson, Cincinnati, Ohio, assignor to Sugar Cane Growers Cooperative of Florida, Inc., Belle Glade, Fla., a corporation of Florida
Filed Dec. 22, 1966, Ser. No. 603,819
Int. Cl. C13d 3/00; C13f 1/06
U.S. Cl. 127—56                                                  13 Claims

ABSTRACT OF THE DISCLOSURE

Sugar-containing muds from a clarification operation in the treatment of cane sugar juices are treated under controlled temperature, pH and flocculant addition conditions in a continuous solid bowl centrifugal separator to separate and recover the valuable sugar juice contained therein with a minimum suspended solids content. The separated thickened mud cake is then subjected to one or more counter-current washing operations with water to recover the major part of the sugar content of the mud cake, the washings being combined with the recovered clarified sugar juice from the first stage separation. The washed cake is discharged at minimum moisture content in a form suitable for recovery of by-product waxes or for burning as a fuel.

---

This invention relates to improvements in the production of raw sugar from sugar cane. More particularly, the invention relates to a novel and improved method of treating clarifier mud in order to enhance the recovery of sugar from the mud and also to facilitate the disposal of mud solids.

In the production of raw cane sugar the juice is extracted from the sugar cane by cutting the cane and crushing it with the addition of a limited amount of maceration to obtain raw sugar juice and sugar cane residue known as bagasse. After purification, as hereinafter described, the raw sugar juice is concentrated by evaporation and is crystallized to obtain raw cane sugar and molasses as the final products. The raw cane sugar is ultimately processed in a sugar refinery to obtain the familiar white sugar.

The raw sugar juice obtained by crushing of the sugar cane is turbid and discolored and contains considerable dirt or mud, which accompanies the sugar cane as harvested in the fields, as well as other solids, such as bagasse fibers and pith or corky material. Clarification of the raw sugar juice is accomplished by liming, heating, and settling to separate insoluble suspended and colloidal solids from the juice, insofar as possible, prior to evaporation of the juice. The normal method of separation after the liming and heating steps is by the use of sedimentation chambers in a conventional commercial clarifier, such as a Dorr clarifier. The clarifier overflow comprises a clear juice or liquor which is removed from the top of the clarifier and is sent to the evaporators. The clarifier underflow is a liquid suspension of high solids content drawn from the bottom of the clarifier and is normally referred to as "clarifier mud." In addition to the field dirt, bagasse fibers, and pith or corky material mentioned above, the clarifier mud may also contain other solids such as insoluble salts, natural gums and resins which have been precipitated and coagulated during the preceding liming and heating steps.

Clarifier mud is ordinarily removed from the clarifier in large quantities and has a relatively high sugar content so that, for economic reasons alone, the mud must be processed to recover its sugar content. Conventionally, the processing of clarifier mud has been carried out by filtration in a filter press or a rotary vacuum filter, the latter being preferred. It is customary to use a suitable filter aid because of the difficult filtration characteristics of the mud. The most common filter aid is finely divided bagasse or bagacillo obtained by screening the bagasse residue of the cane grinding operation.

However, even under the most favorable circumstances, the filtration of clarifier mud is a difficult and inefficient operation characterized by numerous disadvantages. For example, the filter cake obtained usually contains on the order of 80% moisture and is quite difficult to convey, burn, or otherwise dispose of. Furthermore, the substantial amount of bagacillo or other filter aid which must be added in order to achieve satisfactory filtration results in the absorption of a substantial part of the sugar juice which is thereby lost in the filter cake. Washing on the filters is only partially successful in recovering this absorbed sugar juice because of the poor filtration characteristics of the filter cake. Moreover, dependent upon the effectiveness of the filtration apparatus employed, only a portion of the suspended matter in the clarifier mud is retained on the filter and it is necessary to recycle the filtrate to the liming or clarifier stages, thereby resulting in prolonged exposure of the sugar content of the recycled material to high temperatures with a consequent detrimental increase in the amount of inversion of sucrose. A further disadvantage of conventional filtration treatment of clarifier mud is the inefficient recovery of valuable wax and other lipid by-products. For example, in the conventional rotary vacuum filter, a high percentage of the wax is washed out of the filter cake and is recycled in the filtrate to the liming and clarifier stages wherein a substantial part of the wax becomes solubilized or dispersed in colloidal form and passes out with the clarifier overflow. Not only is this loss of wax undesirable, but also the presence of the wax in the clarifier overflow frequently complicates the subsequent evaporation and crystallization operations and results in excessive molasses production.

It has been broadly suggested heretofore, e.g. in U.S. Patents Nos. 462,095, 1,266,882 and 2,992,140, that the principle of centrifugal separation could be used to advantage in the treatment of clarifier mud instead of filtration. However, in accordance with the present invention, it has been discovered that only a specific type of centrifugal separator is capable of effective and reliable operation in the treatment of clarifier mud and, further, that certain critical operating conditions must be observed in order to realize the most advantageous results.

Accordingly, the primary object of the present invention is to provide a novel and improved method for the treatment of clarifier mud which overcomes the difficulties and disadvantages of conventional filtration treatment.

A further object of the invention is to provide a novel and improved method for the treatment of clarifier mud in which the use of vacuum filters, or the like, is completely eliminated.

Another object of the invention is to provide a novel and improved method for the treatment of clarifier mud characterized by the use of a specific type of centrifugal separator and, more particularly, by the use of a plurality of such centrifugal separators.

Still another object of the invention is to provide a novel process of the foregoing type characterized by the use of certain critical operating conditions to achieve maximum clarification of the mud liquor so as to eliminate the necessity for recycling the same to the liming or clarifier stages.

An additional object of the invention is to provide a novel process of the foregoing type characterized by the ability to realize enhanced sugar recovery from the mud without the use of a filter aid while at the same time obtaining a mud solids residue of decreased moisture content.

Other objects and advantages of the invention will become apparent from the subsequent detailed description taken in conjunction with the accompanying drawing, wherein:

FIG. 1 is a schematic flow sheet illustrating a preferred embodiment of the invention; and FIG. 2 is a schematic cross-sectional view of a centrifugal separator of the type utilized in the present invention.

In brief, the novel and improved method of the present invention utilizes a continuous solid bowl centrifugal separator, preferably in a plurality of stages including at least one wash stage. In addition, the centrifugal separation step is preferably carried out within a critical range of pH and temperature of the mud and also with the addition of a minor amount of a flocculating agent to the mud prior to the centrifugal separation step.

Referring to FIG. 1 of the drawing, which comprises a flow sheet of a typical installation embodying the present invention, the underflow liquor or clarifier mud from the conventional clarifier (not shown) flows through a line 10 to a supply tank 11. As heretofore mentioned, the advantages of the invention are realized most fully when certain critical conditions of pH, temperature, and flocculant content are maintained. Thus, the clarifier mud in the supply tank 11 is maintained at a temperature of from about 170° F. to about 210° F., preferably from about 180° F. to about 200° F., by suitable heating means (not shown) such as a steam coil to which steam is supplied through a line 12. The pH of the clarifier mud in the supply tank 11 is regulated and controlled by the addition of a suitable alkaline neutralizing agent to obtain a pH of from about 7 to about 10, preferably from about 7.5 to about 9.0. The preferred neutralizing agent is lime which may be added as a water slurry of hydrated lime. Thus, in FIG. 1 a liquid stream is removed from the bottom of the supply tank 11 through a line 13 and is fed by a recycle pump 14 through a line 16 to a mixing device 17. A water slurry of hydrated lime, e.g. from about 5 to about 15 wt. percent $Ca(OH)_2$, is introduced through a line 18 to the mixer 17, and the resultant mixture is returned to the supply tank 11 through a line 19. The contents of the supply tank 11 are agitated by means of a suitable internal mixing device, such as a horizontal ribbon mixer 20 driven by a motor 21.

From the supply tank 11, the clarifier mud with its temperature and pH adjusted as heretofore described is withdrawn through a line 22 and is pumped by a pump 23 through a line 24 and thence through a pair of parallel branch lines 26 to the feed inlets of a pair of continuous solid bowl centrifugal separators or decanters 27 which are hereinafter described in more detail. Although two parallel centrifugal separators 27 are utilized in the first stage of the illustrated specific embodiment, it should be understood that each stage of the process, including the wash stage or stages hereinafter described, may comprise either a single centrifugal separator or a plurality of separators connected in parallel. Water and a suitable flocculating agent are introduced through lines 28 and 29, respectively, to a flocculant solution tank 31 which is provided with an agitator 32 driven by a motor 33. The flocculant solution is withdrawn through a line 34 and is pumped by means of a pump 36 through a discharge line 37 and a pair of parallel branch lines 38 which connect with the clarifier mud feed lines 26 prior to the introduction of the mud into the centrifugal separators 27.

The flocculant may comprise any suitable material for this purpose of which many are commercially available and are well known to those skilled in the art. Generally, the synthetic high molecular weight water soluble polymers or polyelectrolytes have been found to be most suitable, e.g. the polyacrylamides. The anionic polymers are particularly useful in the pH range of 7 to 10 previously mentioned as most desirable for the mud undergoing treatment in accordance with the invention. By way of example, suitable flocculants of the anionic polymer type are Nalco D 1940 available from Nalco Chemical Co., Chicago, Ill. and Separan AP 30 available from Dow Chemical Co., Midland, Mich. The flocculant concentration in the solution fed to the centrifugal separators through line 37 should not exceed about 0.25 wt. percent and preferably is from about 0.05 to about 0.1 wt. percent. The flocculant content of the clarifier mud introduced to the centrifugal separators should be from about 1.5 to about 5 parts per million by weight based on the total juice to the clarifier (not on the clarifier mud), but in most cases no benefit is gained by exceeding about 2.25 parts per million.

As hereinafter described in more detail, the operation of the continuous solid bowl centrifugal separators 27 results in the continuous separation of dewatered solids or cake and an effluent comprising substantially solids-free sugar juice. The latter juice is of such quality that it may pass directly to the evaporators along with the main stream of clarified juice comprising the overflow from the clarifier. Thus, the separated sugar juice is discharged from the centrifugal separators 27 through branch lines 39 and three-way valves 41 to a main supply line 42 communicating with a storage drum or tank 43. From the storage drum 43, the sugar juice is supplied to the evaporators through a line 44, a pump 46, and a discharge line 47. As a precaution, in the event that the effluent sugar juice from the centrifugal separators 27 does not have the required degree of clarity, e.g. during upset operating conditions or during start-up, the valves 41 may be manipulated either automatically or manually to direct the sugar juice through branch lines 48 to a supply line 49 communicating with a separate storage tank or drum 51. From the drum 51, the unclear sugar juice may be returned by means of a line 52, a pump 53, and a line 54 to the clarifier. However, it will be understood that recycling of the sugar juice from the centrifugal separators 27 to the clarifier is resorted to only as a temporary measure and that in the normal operation of the process in accordance with the present invention, the separated sugar juice will be passed directly to the evaporators.

The mud solids or cake from the centrifugal separators 27 is discharged from the latter through conduits 56 into an elongated mixer 57 which may, for example, be of the horizontal ribbon type comprising a rotating helical agitator 58 driven by motor 59. In the mixer 57 the mud solids are slurried in heated wash water. Thus, steam and water may be supplied through lines 61 and 62, respectively, to a mixer 63, and the resultant hot water is supplied through a line 64 to the mixer 57. A slurry of mud solids in hot water is withdrawn from the mixer 57 through a line 65 and is pumped by means of a pump 66 through a line 67 to the feed inlet of another continuous solid bowl centrifugal separator 68. If desired, flocculant solution from the line 37 may be supplied through a line 69 and commingled with the inlet slurry in the line 67 prior to introduction of the same into the centrifugal separator 68. In general, there will be appreciable carry-over of flocculant in the solids from the separators 27 so that only minor additions of flocculant to the material charged to separator 68 will be needed.

The separated effluent liquor is withdrawn from the centrifugal separator 68 through a line 71 and then passes through a three-way valve 72 to either the lines 42 or 49 and the drums 43 or 51 in the manner heretofore described in connection with the effluent liquor from the centrifugal separators 27. The mud solids or cake from the centrifugal separator 68 is discharged through a conduit 73 onto a continuous belt conveyor 74 and thence into a hopper 76 communicating with an inclined screw conveyor shown fragmentarily at 77. The screw conveyor 77 may discharge the cake into a suitable truck-loading hopper (not shown) for ultimate disposal of the cake in the usual manner.

In the embodiment of the invention illustrated in the flow sheet of FIG. 1, the clarifier mud is subjected to primary separation in a first stage comprising one or more parallel centrifugal separators 27, and the resultant cake is reslurried, washed, and separated in a second stage (or first wash) comprising one or more centrifugal separators 68. However, it should be understood that the invention also contemplates the use of a plurality of countercurrent wash steps, if desired. For economic reasons, it will not ordinarily be advantageous to use more than two wash steps. If a second wash is desirable, this may be accomplished by providing a third stage utilizing one or more additional continuous solid bowl centrifugal separators (not shown), in which event the cake from the centrifugal separator 68 will be slurried with hot water in a second mixer similar to the mixer 57, and the resultant slurry will be introduced, along with flocculant solution, if desired, into the third stage centrifugal separator or separators. The effluent liquor from the third stage centrifugal separator or separators will then be supplied to the mixer 57 for reslurrying the cake from the first stage centrifugal separators 27, and the cake from the third stage centrifugal separator or separators will be discharged to the conveyor 74 as heretofore described. Thus, countercurrent operation is utilized in the multiple wash stages, and there will be no additional wash water requirements for the three stage operation over that of the two stage operation illustrated in FIG. 1.

Although the foregoing description pertains to continuous processing of the clarifier mud, it will be obvious to those skilled in the art that the same method of treatment can be applied in a semi-continuous or batch operation. For example, in a relatively small sugar mill where investment limitations indicate that only a single continuous solid bowl centrifugal separator can be justified, the clarifier mud can be pumped for a period of time through the centrifugal separator on a continuous basis with the separtaed cake being collected in a reslurry tank to which wash water is also supplied. After a suitable volume of wash slurry has accumulated in the reslurry tank, the clarifier mud feed would then be discontinued, and the single centrifugal separator would then be fed with wash slurry for another period of time. The same sequence could be carried on through two or more wash stages as long as sufficient tank capacity is provided for accumulation of separated solids and reslurrying of the same with wash water or washings from prior operations.

As previously mentioned, it has been found by extensive experimental tests the superior clarification is obtained in the first stage centrifugal separation, such that the effluent sugar juice is of sufficient clarity to be passed directly to the evaporators without recycle to the clarifier, if the first stage separation is conducted under certain critical conditions of pH, temperature, and flocculant concentration. In brief, to obtain economically attractive results, the clarifier mud must be at least neutral and preferably alkaline, and the temperature must be elevated sufficiently to reduce the mud viscosity and to maintain the floc in a dehydrated condition so as to avoid reversion to a dispersed condition. Thus, it has been determined that a clarification efficiency (i.e., wt. percent solids removed) on the order of 90% or better is realized when the clarifier mud is adjusted to a pH within the range of from about 7 to about 10, preferably from about 7.5 to about 9, and the temperature of the mud is maintained at from about 170° F. to about 210° F., preferably from about 180° F. to about 200° F. In addition, it has also been found that the flocculant concentration in the feed to the first stage separation has an important effect on clarification efficiency. For best results the flocculant concentration should be at least about 1.5 parts per million and may be as high as about 5 parts per million. Increasing efficiency is realized as the flocculant cencentration is increased to about 2.25 parts per million, but no advantage appears to be gained by using a flocculant concentration in excess of about 2.25 parts per million.

The aforementioned critical conditions of pH, temperature, and flocculant concentration are of greatest importance in the first stage separation which, in the flow sheet of FIG. 1, comprises the parallel centrifugal separators 27. However, the same preferred operating conditions are also desirable, although not as important, in the second or subsequent stages, such as in the second stage centrifugal separator 68 of FIG. 1.

The pumps 14, 23 and 66 are perferably of a type which do not impart violent agitation to the material being pumped since it has been found that gentle handling of the clarifier mud and the reslurried cake is highly desirable in order to minimize the possibility of rupturing and redispersing the floc formed in the clarifier. By observing these precautions, the waxes or other lipids are retained in the floc and eventually are removed in the centrifugal cake or separated solids rather than being lost in the sugar juice sent to the evaporators. As previously mentioned, the waxes or lipids thus retained in the cake can be economically recovered from the cake by solvent extraction, e.g. by the use of heptane, thereby contributing to the overall economic feasibility of the process. In particular, the pumps 14, 23, and 66 may be of the Moyno progressive cavity type, but other types of pumps having similar gentle handling characteristics may also be used.

FIG. 2 is a schematic cross-sectional view showing the operating principle of the continuous solid bowl centrifugal separator or decanter comprising an essential feature of the present invention. The device comprises an imperforate or solid tubular bowl designated generally at 81 and having a uniform diameter cylindrical portion 82 at one end and a tapered or conical section 83 at the opposite end. A screw conveyor, indicated generally at 84, is provided coaxially within the bowl 81 and comprises a cylindrical tubular support 86 with a tapered end portion 87 parallel to the walls of the tapered bowl portion 83. A helical screw conveyor element 88 extends around the exterior of the tubular support 86. Both the bowl 81 and the screw conveyor 84 are supported for rotation about a common horizontal axis within a casing or base 89. A suitable drive means 91 is provided for effecting independent differential rotation of the bowl 81 and the conveyor 84. A feed pipe 92 extends axially into the cylindrical portion of the support 86, and the interior of the support 86 is provided with baffles 93 while the cylindrical wall portion thereof has apertures 94 for directing the feed outwardly against the wall of the rotating bowl 81. A solids discharge outlet 96 is provided at the left end of the device, as viewed in FIG. 2, and a liquid outlet 97 is provided at the opposite end of the device.

In the operation of the separator or decanter the solids and liquid in the material fed through the inlet pipe 92 accumulate in an annular zone at the inner surface of the bowl 81. The depth of the pool of liquid, as indicated at 98, is determined by an adjustable weir or discharge port 99 which controls the overflow into the liquid outlet 97. By changing the radial location of the weir 99, such as by adjustment or replacement, the depth of the liquid pool 98 can be regulated as desired. In a typical device of this type the depth of the liquid pool may range from about ¼" to about 1¾". For maximum clarification and removal of solids from the liquid discharged through the outlet 97, a relatively deep pool 98 may be maintained which extends axially a substantial distance into the tapered section 83 of the bowl. However, if maximum dewatering and draining or drying of the solids discharged through the outlet 96 is desired, a relatively shallow pool 98 is maintained in the bowl 81 which extends only slightly into the tapered section 83 of the bowl, thereby providing a maximum beach area in the tapered section. The solids which accumulate on the wall of the bowl 81 in submerged relation in the liquid pool 98 are moved axially by the rotating screw conveyor portion 88 and are gradually displaced into the conical section 83 of the bowl where the solids are free of the liquid pool 98 and are drained by centrifugal action. The solids are discharged by centrifugal action through an annular opening 101 into the solids outlet 96.

From the foregoing generalized description of the operation of the continuous solid bowl centrifugal separator or decanter it will be understood that the separator, during operation, has distinct clarifying and drying zones as determined by the adjustment of the weir 99 and the resultant depth of the liquid pool 98. In the preferred operation of the process, the first stage centrifugal separator or separators, such as the separators 27 of FIG. 1, should be adjusted to provide a relatively deep liquid pool 98 so as to obtain maximum clarification of the effluent sugar juice. On the other hand, in the second stage separation, such as in the separator 68 of FIG. 1, or in a subsequent stage if a system having more than two stages is used, the separator is regulated to provide a relatively shallow liquid pool 98 so as to obtain maximum draining or drying of the discharged solids.

It will be recognized that the advantages of the present invention, as described herein, can be realized only by the use of a continuous solid bowl centrifugal separator or decanter. A batch type solid bowl centrifugal separator is highly uneconomical and inefficient for the purpose herein contemplated and cannot provide the advantages of high sugar juice recovery and low moisture content of the residual solids as are realized by means of the present invention. Moreover, other types of centrifugal separators, such as the cone type devices, having closely spaced discs or nozzles, cannot be used on slurries of high solids content, such as clarifier mud having a heavy concentration of dirt particles, bagasse fibers, and the like which would result in plugging and clogging of the discs or nozzles.

The advantages of the herein disclosed method of treating clarifier mud by the use of a continuous solid bowl centrifugal separator and observing the critical limitations of pH, temperature, and flocculant concentration may be summarized as follows:

(1) Improved clarification efficiency (as measured by the percent of solids removed from the feed) is realized, especially in the first stage separation, so that it becomes unnecessary to recycle the liquid effluent from the separator to the clarifier. Consequently, a clarifier of reduced size can be utilized, the lime requirements are minimized, and the loss of sucrose due to inversion in the clarifier is diminished.

(2) A substantially improved recovery of sugar juice from the mud is obtained as compared with other methods heretofore suggested.

(3) The amount of residual cake or mud solids is reduced, as compared with other methods of treatment, thereby facilitating the disposal problem. Moreover, the cake has a significantly lower moisture content which permits it to be disposed of by combustion using little or no external fuel.

(4) The use of bagacillo or other filter aid is entirely eliminated with the result that the loss of sugar juice due to absorption in the filter aid is avoided.

(5) The quantity of molasses ultimately produced in the crystallization stage is reduced with a consequent increase in the yield of raw sugar.

(6) The recovery of waxes or lipids becomes economically feasible because a substantial portion of this material is retained in the centrifugal cake, from which it can be recovered by solvent extraction procedures. The absence of filter aid and the reduced moisture content of the centrifugal cake facilitates the extraction procedures. In prior methods of treating clarifier mud, most of the wax constituents were lost in the sugar juice and resulted in inefficient operation of the vacuum crystallization pans with consequent increased molasses production.

For purposes of further illustrating the invention, but not by way of limitation, the following specific examples are presented.

EXAMPLE 1

Material balances based on the treatment of 350 tons/hour of sugar cane juice are shown in Tables I and II. The values shown in Table I are representative data obtained from a sugar mill using a conventional rotary vacuum filter, whereas the values of Table II are based on a pilot plant development study at the same sugar mill using a continuous solid bowl centrifugal separator in accordance with the present invention. It will be understood that in the rotary vacuum filter operation, bagacillo was added to the clarifier underflow as a filter aid and that the filtrate from the rotary vacuum filter was recycled to the clarifier. In the continuous solid bowl centrifugal separator operation, the clarifier underflow was fed to a first stage centrifugal separator without the use of a filter aid, the liquid effluent was not recycled to the clarifier, and the cake from the first stage separator was reslurried in water and introduced to a second stage centrifugal separator. The centrifugal separators were operated in accordance with the preferred operating conditions heretofore described.

TABLE I.—ROTARY VACUUM FILTER MATERIAL BALANCE
[Pounds per hour]

| | Water | Sucrose | Solids | Total |
|---|---|---|---|---|
| Cane juice fed to clarifier | 632,900 | 65,000 | 2,100 | 700,000 |
| Recycle filtrate from vacuum filter | 83,320 | 6,580 | 1,500 | 91,400 |
| Total feed to clarifier | 716,220 | 71,580 | 3,600 | 791,400 |
| Clarifier overflow | 643,620 | 64,400 | 180 | 708,200 |
| Clarifier underflow | 72,600 | 7,180 | 3,420 | 83,200 |
| Bagacillo filter aid to rotary vacuum filter | 1,400 | | 1,400 | 2,800 |
| Total feed to filter | 74,000 | 7,180 | 4,820 | 86,000 |
| Wash water | 25,000 | | | 25,000 |
| Filter cake | 15,680 | 600 | 3,320 | 19,600 |

TABLE II.—MATERIAL BALANCE FOR TWO STAGE CONTINUOUS SOLID BOWL CENTRIFUGAL SEPARATION
[Pounds per hour]

| | Water | Sucrose | Solids | Total |
|---|---|---|---|---|
| Cane juice fed to clarifier | 632,900 | 65,000 | 2,100 | 70,0000 |
| Clarifier overflow | 590,300 | 60,600 | 100 | 651,000 |
| Clarifier underflow | 42,600 | 4,400 | 2,000 | 49,000 |
| First stage centrifugal separation: | | | | |
| Feed | 42,600 | 4,400 | 2,000 | 49,000 |
| Effluent | 36,870 | 3,815 | 135 | 40,820 |
| Cake discharged | 5,730 | 585 | 1,865 | 8,180 |
| Second Stage Centrifugal Separation: | | | | |
| Cake fed | 5,730 | 585 | 1,865 | 8,180 |
| Water for slurrying | 14,420 | | | 14,420 |
| Total feed | 20,150 | 585 | 1,865 | 22,600 |
| Effluent | 15,950 | 465 | 185 | 16,600 |
| Cake discharged | 4,200 | 120 | 1,680 | 6,000 |

A comparison of the data for the final cake in the two operations shows that in the continuous solid bowl centrifugal separation method of the present invention only 120 lbs. per hour of sucrose were lost from the system as compared with 600 lbs. per hour for the rotary vacuum filter operation. This represents a recovery of 80% of the sugar which would normally be lost in the discarded cake. Likewise, it will be seen from Tables I and II that the continuous solid bowl centrifugal separator operation resulted in only 6,000 lbs. per hour of cake to be disposed of whereas 19,600 lbs. per hour of filter cake resulted from the rotary vacuum filter operation. Thus, the present invention resulted in a 69% reduction in the amount of wet cake or a 50% reduction in the amount of solids for disposal. Moreover, the cake of Table II has a significantly lower water content. With a third stage in which the cake from the second stage is reslurried with water, only 25 lbs. per hour of sucrose is lost in the cake, which represents a recovery of 96% of the sugar presently lost in the filter cake from the rotary vacuum filter operation.

EXAMPLE 2

Experimental runs were made using a continuous solid bowl centrifugal separator (18" in diameter and 28" in length) manufactured by the Bird Machinery Company, South Walpole, Mass. The sugar cane clarifier mud used in these runs contained 4.35 wt. percent suspended solids. The separator was operated at 2140 r.p.m. which was equivalent to 1145 gravities. In each test the clarifier mud was treated in a first stage comprising a single centrifugal separator, and the resultant cake was reslurried with wash water and separated in a second stage comprising a single centrifugal separator.

In this test the clarifier mud was fed to the first stage centrifugal separator at a rate of 16.7 gallons per minute and at a temperature of 195° F. but without the use of a flocculating agent. The pH of the mud was 6.8, and no adjustment of pH was made. By regulation of the adjustable weir of the separator to obtain a pool depth of 1½", the effluent liquor discharged from the centrifugal separator contained 1.51 wt. percent solids which represents a removal of 71% of the solids content of the clarifier mud. The separated mud cake contained 29.6 wt. percent solids and 7.0 wt. percent sucrose.

In the second stage or first wash the separated mud cake from the first stage was treated with 2.2 times its weight of water and heated to 190° F. to obtain a slurry feed containing about 1.9 wt. percent sucrose. With a slurry feed rate of 17.1 gallons per minute to the centrifugal separator and with a pool depth of 1½", the resultant effluent liquor contained 2.87 wt. percent solids, indicating a clarification or solids removal efficiency of 66%. The separated mud cake from the second pass contained 29.2 wt. percent solids and 1.5 wt. percent sucrose.

EXAMPLE 3

This test was carried out under conditions comparable to those of Example 2 except that the pH of the clarifier mud was adjusted in accordance with the present invention. Thus, lime was added to increase the pH of the mud from 6.8 to 7.8, and the mud was fed at a rate of 17.4 gallons per minute and a temperature of 195° F. to the first stage centrifugal separator. The initial solids content of the clarifier mud was 4.35 wt. percent, as in Example 2.

While maintaining a pool depth of 1½", the effluent liquor from the first stage centrifugal separator contained 1.08% solids, indicating a removal of 80% of the solids content of the mud. Consequently, the increase in pH from 6.8 to 7.8 resulted in a distinct improvement in the separation of solids from the clarifier mud. The cake from the first stage centrifugal separator contained 28.9 wt. percent solids and 8.0 wt. percent sucrose.

In the second stage the cake was slurried with 1.7 times its weight of water, heated to 195° F., and introduced into the centrifugal separator at a rate of 16.6 gallons per minute. With a pool depth of 1½", the effluent liquor contained 1.15 wt. percent solids, indicating 85% solids removal. The cake from the second stage contained 28.1 wt. percent solids and 1.5 wt. percent sucrose.

EXAMPLE 4

The conditions of this test were generally the same as the conditions of Example 3, except that a flocculant was added to the clarifier mud before being introduced into the first stage centrifugal separator. Thus, the pH of the clarifier mud was increased from 6.8 to 7.6 by the addition of lime, and a flocculant comprising Nalco D 1940 was added to the mud in an amount equivalent to approximately 2 parts per million based upon the total juice. The mud was then fed at a feed rate of 15.3 gallons per minute and a temperature of 190° F. to the first stage centrifugal separator. The inlet feed to the separator had a solids content of 4.60 wt. percent, and the effluent liquor contained 0.39 wt. percent solids, indicating a removal of 93% of the suspended solids content. Thus, the combined effect of pH adjustment, temperature control, and flocculant addition resulted in a still further improvement in solids separation. The cake from the first stage separator contained 29.4 wt. percent solids and 10.3 wt. percent sucrose.

In the second stage the separated cake was slurried with 2.3 times its weight of water, heated to 195° F., and, after the addition of 0.5 parts per million of Nalco D 1940 flocculant, the slurry was fed to the centrifugal separator. At a feed rate of 15.8 gallons per minute and a pool depth of 1½", the effluent liquor contained 0.85 wt. percent solids, indicating 90% solids removal. The residual cake from the single stage wash contained 26.1 wt. percent solids and 2.3 wt. percent sucrose.

EXAMPLE 5

To demonstrate the importance of temperature, comparative tests were made on the cake obtained from the first stage centrifugal separation of Example 4. In the first test the cake was slurried with 2.2 times its weight of water at a temperature of 138° F., and 0.5 parts per million of Nalco D 1940 flocculant was added to the slurry prior to introduction into the centrifugal separator. At a feed rate of 15.6 gallons per minute and a pool depth of 1½", the effluent liquor contained 1.34 wt. percent solids, indicating a solids removal of 85%. The residual cake contained 26.2 wt. percent solids and 2.3 wt. percent sucrose.

In a comparable test the conditions were maintained essentially the same except that the slurry was introduced to the separator at a temperature of 190° F. In this test the effluent liquor from the separator contained 0.83 wt. percent solids, indicating 91% solids removal as compared to the 85% solids removal obtained at a temperature of 138° F. The residual cake contained 27.5 wt. percent solids and 2.3% sucrose. Thus, there was an improved efficiency of solids removal at the higher temperature.

Although the invention has been described in particular detail with respect to certain specific embodiments thereof, it is to be understood that various modifications and equivalents may be resorted to without departing from the scope of the invention as defined in the appended claims.

We claim:

1. In the production of raw sugar from sugar cane wherein raw sugar juice is treated and fed to a clarifier, clarified sugar juice is withdrawn from the clarifier and passed to an evaporator, and clarifier mud is also withdrawn from the clarifier; the improved method of treating the clarifier mud which comprises:

adjusting the pH of the clarifier mud to obtain a pH of from about 7 to about 10;

maintaining the temperature of the clarifier mud at from about 170° F. to about 210° F.;

adding a flocculant to the clarifier mud in an amount sufficient to obtain a flocculant content of from about 1.5 to about 5 parts per million by weight based on the sugar juice fed to the clarifier;

subjecting the clarifier mud having said pH, temperature, and flocculant content to a first centrifugal separation step in a continuous solid bowl centrifugal separator;

removing accumulated solids from said first centrifugal separation step and washing the same with an aqueous wash liquid;

subjecting the resultant slurry to a second centrifugal separation step in a continuous solid bowl centrifugal separator;

recovering effluent sugar-containing liquors from said first and second centrifugal separation steps; and removing accumulated solids from said second centrifugal separation step.

2. The method of claim 1 further characterized in that said effluent sugar-containing liquors are passed directly to the evaporator without being recycled to the clarifier.

3. The method of claim 1 further characterized in that said aqueous wash liquid comprises water.

4. The method of claim 1 further characterized in that the solids removed from said second centrifugal separation step are washed with water, the resultant slurry is subjected to a third centrifugal separation step in a continuous solid bowl centrifugal separator, effluent aqueous liquor from said third centrifugal separation step is used as the aqueous wash liquid to wash the solids removed from said first centrifugal separation step, and accumulated solids are recovered from said third centrifugal separation step.

5. The method of claim 1 further characterized in that the pH of said clarifier mud is adjusted to obtain a pH of from about 7.5 to about 9.

6. The method of claim 1 further characterized in that the temperature of said clarifier mud is maintained at from about 180° F. to about 200° F.

7. The method of claim 1 further characterized in that the amount of flocculant added is sufficient to obtain a flocculant content of from about 1.5 to about 2.25 parts per million by weight based on the sugar juice fed to the clarifier.

8. The method of claim 1 further characterized in that the clarifier mud introduced to said first centrifugal separation step has a pH of from about 7.5 to about 9, a temperature of from about 180° F. to about 200° F., and a flocculant content of from about 1.5 to about 2.25 parts per million by weight based on the sugar juice fed to the clarifier.

9. In the production of raw sugar from sugar cane wherein raw sugar juice is treated and fed to a clarifier, clarified sugar juice is withdrawn from the clarifier and passed to a evaporator, and clarifier mud is also withdrawn from the clarifier; the improved method of treating the clarifier mud which comprises:
  subjecting the clarifier mud to centrifugal separation in a first stage comprising at least one continuous solid bowl centrifugal separator;
  removing accumulated solids from said first stage and slurrying the same in an aqueous wash liquid;
  subjecting the resultant slurry to centrifugal separation in a second stage comprising at least one additional continuous solid bowl centrifugal separation;
  recovering effluent sugar-containing liquors from both said first and said second stages; and
  removing accumulated solids from said second stage.

10. The method of claim 9 further characterized in that the solids removed from said second stage are slurried with water, the resultant slurry is subjected to centrifugal separation in a third stage comprising at least one additional continuous solid bowl centrifugal separator, effluent aqueous liquor from said third stage is used as the aqueous wash liquid for slurrying the solids removed from said first stage, and accumulated solids are recovered from said third stage.

11. The method of claim 9 further characterized in that each of said separators has adjustable means for regulating the depth of the pool of liquid in the separator, said means being adjusted in said first stage to obtain a relatively deep pool so as to provide relatively greater solids removal from the effluent liquor, and said means being adjusted in said second stage to obtain a relatively shallow pool so as to provide relatively greater draining and drying of the solids removed from said second stage.

12. The method of claim 9 further characterized in that said clarifier mud, before introduction into said first stage, is treated to provide a pH of from about 7 to about 10, a temperature of from about 170° F. to about 210° F., and a flocculant content of from about 1.5 to about 5 parts per million by weight based on the sugar juice fed to the clarifier.

13. The method of claim 12 further characterized in that said clarifier mud, before introduction into said first stage, has a pH of from about 7.5 to about 9, a temperature of from about 180° F. to about 200° F., and a flocculant content of from about 1.5 to about 2.25 parts per million by weight based on the sugar juice fed to the clarifier.

References Cited

UNITED STATES PATENTS

| | | | |
|---|---|---|---|
| 462,095 | 10/1891 | Hamelburg | 127—55 |
| 789,478 | 5/1905 | Baldwin | 127—56 |
| 978,750 | 12/1910 | Homans | 127—56 |
| 1,101,940 | 6/1914 | Kopke | 127—56 |
| 1,266,882 | 5/1918 | Thomas et al. | 127—56 |
| 1,839,733 | 1/1932 | Berge | 127—56 |
| 2,478,971 | 8/1949 | Lindgren | 127—56 |
| 2,610,932 | 9/1952 | Eakin | 127—55 |
| 2,992,140 | 7/1961 | Gaiennie et al. | 127—56 |
| 3,114,655 | 12/1963 | Jiskra | 127—56 X |

OTHER REFERENCES

Smart, "Centrifugal . . . Liquors" Int. Sug. J. p. 293–296, November 1946.

Bonneville, "Clarification . . . Polyelectrolytes" Sugar 48, 36–39, November 1953.

Perry, "Chemical Engineer's Handbook," p. 86–93, McGraw-Hill, 1963.

JOSEPH SCOVRONEK, Primary Examiner

D. G. CONLIN, Assistant Examiner

U.S. Cl. X.R.

127—11, 48, 55; 233—7